United States Patent [19]
Toyouchi et al.

[11] Patent Number: 5,961,915
[45] Date of Patent: *Oct. 5, 1999

[54] FLAME RETARDANT, HIGH PRECISION RESIN MECHANICAL PART FOR USE IN AN OFFICE AUTOMATION MACHINE

[76] Inventors: Kaoru Toyouchi, 1-1-804, Namiki 2-chome, Kanazawa-ku Yokohama-shi Kanagawa-ken, Japan, 236; Katsumi Nabeshima, Room No. 1245, Bldg. No. 12, Shinsakuragaoka-Danchi, 312-3, Imai-machi, Hodogaya-ku Yokohama-shi Kanagawa-ken, Japan, 240

[ * ] Notice: This patent issued on a continued prosecution application filed under 37 CFR 1.53(d), and is subject to the twenty year patent term provisions of 35 U.S.C. 154(a)(2).

[21] Appl. No.: 08/704,791

[22] PCT Filed: Apr. 10, 1995

[86] PCT No.: PCT/JP95/00703

§ 371 Date: Aug. 13, 1996

§ 102(e) Date: Aug. 13, 1996

[87] PCT Pub. No.: WO95/27603

PCT Pub. Date: Oct. 19, 1995

[30] Foreign Application Priority Data

Apr. 8, 1994 [JP] Japan ......................................... 6-71044

[51] Int. Cl.$^6$ .................................................. B29D 22/00
[52] U.S. Cl. ................ 264/572; 264/328.1; 264/331.11; 524/140; 524/141; 524/136; 524/143
[58] Field of Search ..................................... 524/141, 143, 524/136, 140; 264/572, 328.1, 331.11

[56] References Cited

U.S. PATENT DOCUMENTS

| | | | |
|---|---|---|---|
| 4,156,663 | 5/1979 | Okamoto et al. ......................... | 524/41 |
| 4,222,928 | 9/1980 | Kawamura et al. ................. | 525/107 X |
| 4,404,125 | 9/1983 | Abolins et al. .......................... | 252/511 |
| 5,002,827 | 3/1991 | Shimada et al. ........................ | 428/407 |
| 5,204,394 | 4/1993 | Gosens et al. ........................... | 524/125 |
| 5,272,193 | 12/1993 | Fuhr et al. ............................... | 524/141 |
| 5,455,292 | 10/1995 | Kakegawa et al. ...................... | 524/143 |

FOREIGN PATENT DOCUMENTS

| | | |
|---|---|---|
| 0 085 438 A1 | 8/1983 | European Pat. Off. . |
| 0 336 557 A1 | 10/1989 | European Pat. Off. . |
| 0 611 798 | 8/1994 | European Pat. Off. . |
| 0 611 798 A1 | 8/1994 | European Pat. Off. . |
| 62-109855 | 5/1987 | Japan . |
| 4-348157 | 12/1992 | Japan . |
| 57-57092 | 12/1992 | Japan . |
| 6-207089 | 7/1994 | Japan . |
| 7-53876 | 2/1995 | Japan . |
| 2 217 644 | 11/1989 | United Kingdom . |
| WO 93/04119 | 3/1993 | WIPO . |
| WO 93/08595 | 4/1993 | WIPO . |

OTHER PUBLICATIONS

Sakamoto Masahi (Asahi), Low–Warpage Styrene Resin Composition in Patent Abstracts of Japan, vol. 15, No. 31, Jan. 24, 1991.

*Primary Examiner*—Judy M. Reddick

[57] ABSTRACT

Disclosed is a flame retardant, high precision resin mechanical part for use in office automation machines required to function with high accuracy and high precision, which is made by injection molding a thermoplastic resin composition comprising: (A) an amorphous thermoplastic resin; (B) an inorganic filler in a scale form; and (C) a specific phosphoric acid ester in which phosphoric acid ester groups are bonded through a bisphenol.

7 Claims, 2 Drawing Sheets

220mm

FLAME RETARDANT, HIGH PRECISION RESIN MECHANICAL PART FOR USE IN AN OFFICE AUTOMATION MACHINE

BACKGROUND OF THE INVENTION

1. Technical Fields

The present invention relates to a flame retardant, high precision resin mechanical part for use in an office automation machine, which is made by injection molding a thermoplastic resin composition. More particularly, the present invention is concerned with a flame retardant, high precision resin mechanical part for use in office automation machines required to function with high accuracy and high precision, which part is made by injection molding a thermoplastic resin composition comprising: (A) an amorphous thermoplastic resin; (B) an inorganic filler in a scale form; and (C) a specific phosphoric acid ester. The high precision resin mechanical part of the present invention is free from conventionally experienced disadvantages, such as volatilization of a flame retardant contained in the resin, smoking caused by the volatilization of the flame retardant and occurrence of MD (mold deposit) during the production thereof by molding, and bleeding of the flame retardant during the use thereof. Further, the mechanical part of the present invention is unlikely to suffer from warpage, and has an advantageously small shrinkage ratio during the production thereof by molding. Therefore, the mechanical part of the present invention has not only high precision but also various excellent mechanical properties, such as extremely low anisotropy in linear expansion coefficient, and excellent vibration characteristics. The high precision resin mechanical part of the present invention can be advantageously used as a mechanical part for high precision machines which are required to function with high accuracy and high precision even under various stringent conditions. Examples of such high precision machines include computers, game machines, sound-reproducing systems, audio-visual machines, copiers, printers, facsimile machines, personal computers, word processors, portable communication apparatus and composite machines composed thereof.

2. Technical Background

Recently, in various fields, such as automobiles, office machines, computers and household electric appliances, it has been attempted to substitute a resin part for parts which have conventionally been made from a metallic material, such as sheet metals and die-casted aluminum. Such an attempt has been made because a part made from a resin is advantageous in that such a resin part has not only light weight, but also can be produced with high productivity at low cost. Therefore, there is an increasing demand for reinforced resins which can be substituted for metallic materials in producing a mechanical part. Particularly, there is a strong demand for reinforced resins which can be used for producing mechanical parts for OA (office automation) machines, such as copiers, printers, facsimile machines, CD-ROMs, personal computers, word processors and communication apparatuses. [The copiers, printers and facsimile machines are OA machines which are equipped with a printing mechanism, such as a dry-type, diazo-type, LB (laser beam)-type, BJ (bubble jet)-type, dot-type or heat sensitive-type printing mechanism.] In accordance with such a strong demand for reinforced resins, it has been intensively studied to develop amorphous thermoplastic resins (e.g., a reinforced, flame retardant polyphenylene ether resin and a reinforced, flame retardant polycarbonate resin) which have excellent mechanical properties and excellent molded form characteristics, so as to produce from such resins mechanical parts which have conventionally been produced from metallic materials, such as sheet metals and die-casted aluminum.

It is a requisite that a resin mechanical part of an OA machine have excellent molded form characteristics, mechanical properties (e.g., rigidity and strength), heat resistance, flame retardancy, dimensional precision and dimensional stability.

Among these properties, the requirements for dimensional precision and dimensional stability are most strict. For example, with respect to the mechanical part of a CD-ROM, when a traverse base, which guides and holds an optical lens unit, has a dimensional strain, the misreading of data from the CD occurs. With respect to the internal mechanical parts of OA machines having a laser beam-type printing mechanism, such as a copier, a printer and a facsimile machine, when such mechanical parts have a dimensional strain, the misreading of data is caused, thereby leading to disadvantages, such as blurring of the printed image. Further, with respect to the internal mechanical parts of OA machines having a diazo-type, bubble jet-type or heat sensitive-type printing mechanism, when such mechanical parts have a dimensional strain, the printed letter becomes blurred.

With respect to such mechanical parts as mentioned above, it is required that the dimensional precision thereof be such that any errors or deviations must be only on the order of several tens of $\mu$m.

When it is attempted to produce a mechanical part of an OA machine from an amorphous thermoplastic resin in accordance with a conventional method, the following problems are encountered.

As a conventional technique for imparting a resin with high rigidity and strength, there has been known a method in which a fibrous inorganic filler, such as a glass fiber, is blended with a resin. This technique has disadvantages as follows. That is, when a fibrous inorganic filler having a large aspect ratio (length/thickness), such as an inorganic fiber or a whisker, is added to the resin, and the resultant resin composition containing such a fibrous inorganic filler is subjected to injection molding, the fibrous inorganic filler is oriented along the direction of flow of the resin. Accordingly, an obtained molded article inevitably becomes anisotropic with respect to the rigidity, strength, shrinkage ratio (occurring during molding thereof) and linear expansion coefficient. Therefore, it is likely that the rigidity and strength of the molded article become poor and that the shaped article suffers warpage which leads to a dimensional deformation or dimensional strain of the molded article. Further, this technique is also disadvantageous in that the anisotropy of linear expansion coefficient causes the molded article to be susceptible to a change in temperature. Specifically, the molded article, which is anisotropic in linear expansion coefficient, easily suffers dimensional deformation when the temperature changes, so that it is poor in dimensional stability.

On the other hand, when a conventional inorganic filler having a small aspect ratio, such as glass beads and calcium carbonate, is used, the obtained molded article is improved with respect to dimensional precision and dimensional stability. However, this molded article also is disadvantageous in that it has poor rigidity and strength.

For the purpose of improving the flame retardancy of an amorphous thermoplastic resin, a flame retardant is generally used. For example, a conventional halogenated aromatic compound, such as tetrabromobisphenol A (TBA) and polybromobiphenyl oxide (PBBO), has been widely used to improve the flame retardancy of an amorphous thermoplastic resin with the exception of polyphenylene ether resin. However, with respect to not only the halogen type flame retardant, but also antimony trioxide ($Sb_2O_3$), which is generally used as an auxiliary flame retardant for the halogen type flame retardant, is undesirable in view of the adverse influence on the environment and the safety to human body. Therefore, in the market, there is an increasing tendency to refrain the use of the above-mentioned halogen type flame retardant and antimony trioxide. Meanwhile, there is known a polyphenylene ether resin composition or a polycarbonate resin composition, in which, as a non-halogen type flame retardant, a phosphorus compound is employed (see, for example, G.B. Patent Application Publication No. 2043083 and U.S. Pat. No. 5,204,394). Specifically, an organic phosphoric acid ester compound, such as triphenyl phosphate, cresyl diphenyl phosphate and tricresyl diphenyl phosphate, has been widely used as the flame retardant. However, the resin composition containing the organic phosphoric acid ester compound is disadvantageous in that the phosphoric acid ester compound is likely to be volatilized or generate smoke during molding of the resin composition containing the same and that MD (mold deposit) is likely to occur on the inner surface of a mold cavity. Further, a molded article produced from the resin composition containing such a phosphoric acid ester compound has a defect in that the phosphoric acid ester compound bleeds out on the surface of the molded article (bleeding), thereby causing the molded article to suffer discoloration, blistering, cracking and the like.

As a method for solving the above-mentioned problems, it has been proposed to employ, as a flame retardant, an organic phosphorus compound having a high molecular weight. Specifically, it has been attempted to employ, as a flame retardant, a phosphorus compound having a high molecular weight, such as tri(2,6-dimethylphenyl) phosphate, resorcinol-bisdiphenyl phosphate and tribiphenyl phosphate (see, for example, International Patent Application Publication No. 94/03535 corresponding to European Patent Application Publication No. 0 611 798). However, these organic phosphorus compounds are disadvantageous in that such a compound must be used in a large amount in order to render flame retardant the resin, and that when the resin composition, which is rendered flame retardant with a phosphoric acid ester compound, is subjected to molding, corrosion of a metallic mold is caused during the molding thereof. Further, a mechanical part produced from such a resin composition has poor resistance to moisture and heat. Specifically, when the above-mentioned mechanical part is placed under high temperature and high humidity conditions, the resin of the mechanical part absorbs water and/or the flame retardant contained in the resin undergoes denaturation, thereby deteriorating various properties of the resin, such as electrical characteristics, flame retardancy and dimensional stability. As is understood from the above, the conventional techniques have various problems and it has been impossible to substitute a resin part containing a non-halogen type retardant for a metallic mechanical part for an OA machine. That is, it has been extremely difficult to produce a mechanical part, from a resin composition containing a non-halogen type flame retardant, which part has excellent mechanical properties, dimensional precision, molded form characteristics and flame retardancy.

SUMMARY OF THE INVENTION

In these situations, the present inventors have made extensive and intensive studies with a view toward developing a flame retardant, high precision resin mechanical part which is free from the above-mentioned problems accompanying the conventional resin mechanical parts. As a result, it has unexpectedly been found that a mechanical part, which is produced by injection molding a thermoplastic resin composition comprising an amorphous thermoplastic resin, an inorganic filler (e.g., glass flakes) in a scale form, and a specific phosphoric acid ester as a flame retardant in which phosphoric acid ester groups are linked through a bisphenol, is advantageous in that such a resin mechanical part is free from conventionally experienced disadvantages, such as volatilization of a flame retardant contained in the resin, smoking caused by the volatilization of the flame retardant and occurrence of MD (mold deposit) during the molding thereof, and bleeding of the flame retardant during the use thereof; that such a mechanical part is unlikely to suffer from warpage, and has an advantageously small shrinkage ratio during the production thereof by molding; and that, therefore, such a mechanical part has not only high precision but also various excellent mechanical properties, such as extremely low anisotropy in linear expansion coefficient, and excellent vibration characteristics, so that the resin mechanical part can be advantageously used as a mechanical part for high precision machines which are required to function with high accuracy and high precision even under various stringent conditions. The present invention has been completed, based on this novel finding.

Accordingly, it is a primary object of the present invention to provide a flame retardant, high precision resin mechanical part for use in OA machines, which has not only excellent mechanical properties but also high dimensional precision, as required for a mechanical part of an OA machine, and which, therefore, can be substituted for a conventional mechanical part which is made from metallic materials (such as sheet metals and die-casted aluminum).

The foregoing and other objects, features and advantages of the present invention will be apparent to those skilled in the art from the following detailed description and appended claims taken in connection with the accompanying drawings.

BRIEF DESCRIPTION OF THE DRAWINGS

In the accompanying drawings:

FIG. 1(a) is a diagrammatic perspective view of a tray-shaped mechanical part produced in Examples 1 through 30;

FIG. 1(b) is a diagrammatic cross-sectional view of the tray-shaped mechanical part of FIG. 1(a), taken along line IB—IB.

A through F: Measurement sites at which the dimensional precision is measured [At each of A through D, the dimensional precision is measured in terms of a gap between a molded article and a mold platen; and at each of E and F, the dimensional precision is measured in terms of a difference between the actual dimension of a molded article and the predetermined (designed) dimensional value (4.1 mm and 6.1 mm, respectively) shown in FIG. 1(b).]

G: Site of the molded article corresponding to the pin gate of a mold

Figure 2:
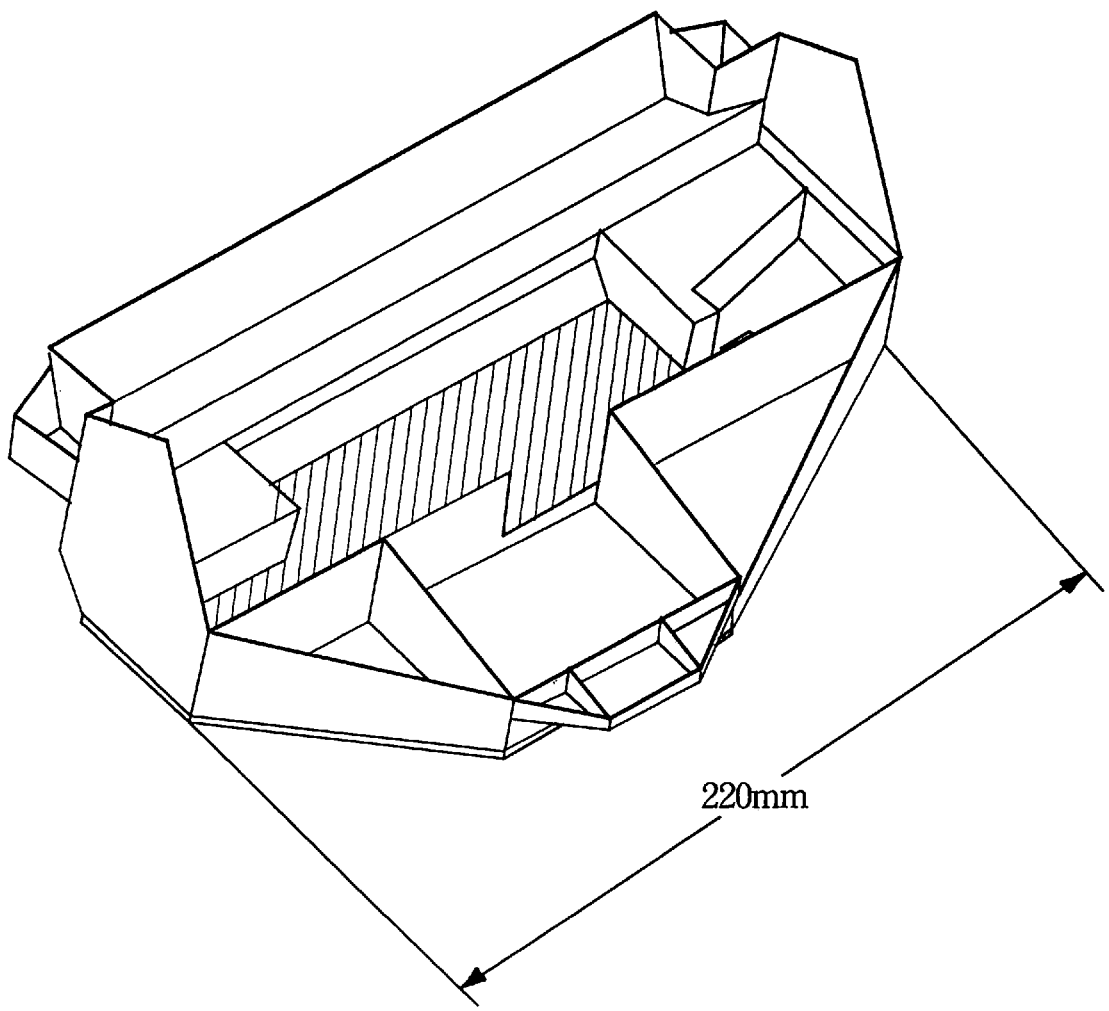
FIG. 2 is a diagrammatic perspective view of a mechanical part, i.e., a chassis for holding an optical element, produced in Examples 31 to 36.

In FIG. 2, the hatched portion indicates a section at which measurement of flatness is done.

DETAILED DESCRIPTION OF THE INVENTION

In accordance with the present invention, there is provided a flame retardant, high precision resin mechanical part for use in office automation machines required to function with high accuracy and high precision, which is made by injection molding a thermoplastic resin composition comprising:

(A) 100 parts by weight of an amorphous thermoplastic resin;

(B) 5 to 150 parts by weight of an inorganic filler in a scale form; and (C) 3 to 50 parts by weight of a phosphoric acid ester represented by the following formula (I):

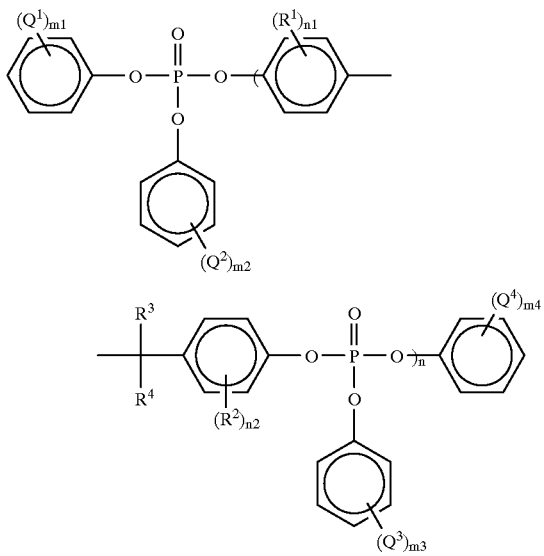

(I)

wherein each of $Q^1$, $Q^2$, $Q^3$ and $Q^4$ independently represents a hydrogen atom or an alkyl group having 1 to 6 carbon atoms; each of $R^1$, $R^2$, $R^3$ and $R^4$ independently represents a methyl group or a hydrogen atom; n represents an integer of 1 or more; each of n1 and n2 independently represents an integer of from 0 to 2; and each of m1, m2, m3 and m4 independently represents an integer of from 1 to 3.

For ease in understanding of the present invention, the essential construction and various preferred embodiments of the present invention are enumerated below.

1. A flame retardant, high precision resin mechanical part for use in office automation machines required to function with high accuracy and high precision, which is made by injection molding a thermoplastic resin composition comprising:

(A) 100 parts by weight of an amorphous thermoplastic resin;

(B) 5 to 150 parts by weight of an inorganic filler in a scale form; and (C) 3 to 50 parts by weight of a phosphoric acid ester represented by the following formula (I):

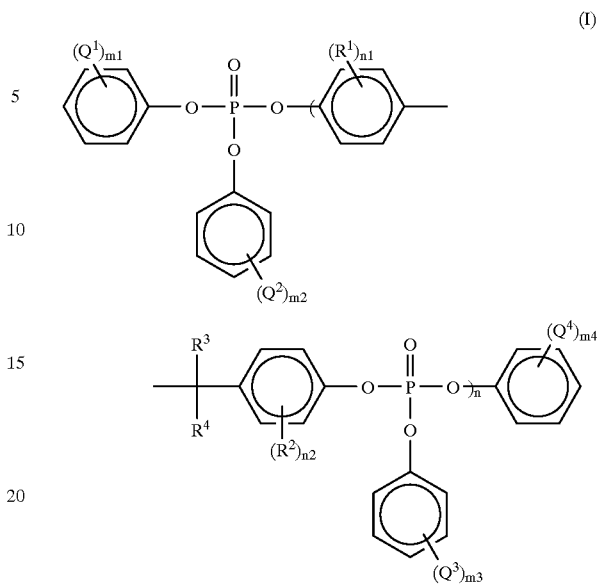

(I)

wherein each of $Q^1$, $Q^2$, $Q^3$ and $Q^4$ independently represents a hydrogen atom or an alkyl group having 1 to 6 carbon atoms; each of $R^1$, $R^2$, $R^3$ and $R^4$ independently represents a methyl group or a hydrogen atom; n represents an integer of 1 or more; each of n1 and n2 independently represents an integer of from 0 to 2; and each of m1, m2, m3 and m4 independently represents an integer of from 1 to 3.

2. The flame retardant, high precision resin mechanical part according to item 1 above, wherein the injection molding is gas-assisted injection molding.

3. The flame retardant, high precision resin mechanical part according to item 1 above, wherein the inorganic filler in a scale form is comprised of glass flakes.

4. The flame retardant, high precision resin mechanical part according to item 1 above, wherein the inorganic filler in a scale form is comprised of mica flakes.

5. The flame retardant, high precision resin mechanical part according to item 1 above, wherein the inorganic filler in a scale form is comprised of glass flakes and mica flakes.

6. The flame retardant, high precision resin mechanical part according to any one of items 1 to 5 above, wherein the thermoplastic resin composition further comprises a fibrous reinforcing filler, and wherein the total weight of the inorganic filler in a scale form and the fibrous reinforcing filler is 150 parts by weight or less.

7. The flame retardant, high precision resin mechanical part according to item 6 above, wherein the fibrous reinforcing filler is present in an amount of from 25 to 75% by weight, based on the total weight of the inorganic filler in a scale form and the fibrous reinforcing filler.

It is a requisite that the amorphous thermoplastic resin composition constituting the high precision mechanical part of the present invention for use in an office automation machine contain an inorganic filler in a scale form. Examples of inorganic fillers in a scale form include glass flakes and mica flakes.

With respect to glass flakes for use as the inorganic filler in a scale form, it is desired that the glass flakes incorporated in the resin composition have a major diameter of 1000 μm or less, preferably 1 to 500 μm, and have a weight average aspect ratio (ratio of a weight average major diameter to a weight average thickness) of 5 or more, preferably 10 or more, more preferably 30 or more. When glass flakes are mixed with other components to produce the resin composition, glass flakes undergo breakage, so that the size of the glass flakes is decreased. Measurement of the major diameter and thickness of glass flakes incorporated in a resin composition can be done by a method in which the resin composition is dissolved and subjected to filtration to thereby collect the glass flakes, and the dimensional characteristics of glass flakes are examined, using an optical microscope.

Examples of commercially available glass flakes which can be suitably employed in the present invention include Micro Glass Fleka (tradename of glass flakes sold by Nippon Sheet Glass Co., Ltd., Japan). In the present invention, commercially available glass flakes can be used as such, but commercially available glass flakes may be appropriately pulverized before incorporation into a resin composition. When glass flakes have a major diameter of more than 1000 µm, it becomes difficult to uniformly mix the glass flakes with a resin, so that it is possible that the mechanical properties of a molded resin article become non-uniform. When glass flakes have an aspect ratio of less than 5, the heat distortion temperature of the molded resin article is not satisfactorily increased, and the Izod impact strength and rigidity tend to be low. For improving the compatibility of glass flakes with a resin, glass flakes which have been surface-treated with a suitable coupling agent may be used. Examples of coupling agents include a silane type coupling agent (e.g., an aminosilane type coupling agent) and a titanate type coupling agent.

Mica employable in the present invention is in a scale form. For example, Suzorite Mica (manufactured and sold by SUZORITE MICA PRODUCTS, INC., Canada) can be suitably employed as mica flakes. It is preferred that mica flakes have a weight average diameter of 1000 µm or less, preferably 500 µm or less, more preferably 200 µm or less. From the viewpoint of improving rigidity, it is preferred that mica flakes have a weight average aspect ratio (weight average diameter of flakes/weight average thickness of flakes) of 10 or more, preferably 30 or more, more preferably 100 or more. The lower limit of the weight average diameter of commercially available mica flakes is about 20 µm. As in the case of glass flakes, when mica flakes are mixed with other components to produce the resin composition, mica flakes undergo breakage, so that the size of the mica flakes is decreased. Measurement of the size of mica flakes incorporated in a resin composition can be done by the same method as in the case of glass flakes. For improving the compatibility of mica flakes are mixed with a resin, mica flakes which have been surface-treated with coupling agents, such as those as mentioned above, can be suitably employed.

The resin composition constituting the mechanical part of the present invention for use in an office automation machine contains an inorganic filler in a scale form in an amount of 5 to 150 parts by weight, preferably 10 to 100 parts by weight, more preferably 20 to 70 parts by weight, per 100 parts by weight of the amorphous thermoplastic resin. When the amount of the inorganic filler is less than 5 parts by weight, the rigidity is unsatisfactory and the linear expansion coefficient is not satisfactorily improved. On the other hand, when the amount of the inorganic filler is more than 150 parts by weight, a uniform dispersion of the inorganic filler is difficult, so that the molding properties of the resin composition and the appearance of the shaped article become poor. When the amount of the inorganic filler is from 20 to 70 parts by weight, the most preferred balance of the molded form characteristics, thermal characteristics, mechanical properties and dimensional precision can be obtained.

In the present invention, for improving the strength of the mechanical part, the thermoplastic resin composition may further contain a fibrous reinforcing filler and, in this case, the total weight of the inorganic filler in a scale form and the fibrous reinforcing filler is 150 parts by weight or less.

In the present invention, the inorganic filler and fibrous reinforcing filler can be used in various manners. For example, glass flakes can be used alone; a combination of glass flakes and a fibrous reinforcing filler can be used; a combination of glass flakes and mica flakes can be used; mica flakes can be used alone; a combination of mica flakes and a fibrous reinforcing filler can be used; and a combination of glass flakes and mica flakes and a fibrous reinforcing filler can be used. When mica flakes are used alone, the mechanical part obtained has a high dimensional precision, but the mechanical properties, especially Izod impact strength, of the mechanical part tend to be low. Therefore, when mica flakes are used as an inorganic filler in a scale form, it is preferred that at least one member selected from the group consisting of glass flakes and a fibrous reinforcing filler be also employed.

Examples of fibrous reinforcing fillers which are employable in combination with an inorganic filler in a scale form include fibrous reinforcing agents, such as glass fibers, carbon fibers, ceramic fibers and metallic fibers. From the viewpoint of economy, improvement in molding properties and a good balance of mechanical properties of the resin composition, glass fibers are most preferred as a fibrous reinforcing filler. With respect to the diameter and average length of glass fibers, there is no particular limitation. However, from the viewpoint of improving the dimensional precision of the mechanical part, it is preferred that glass fibers have a relatively short length. Specifically, the average length of glass fibers incorporated in a resin composition is preferably 0.1 to 1 mm, more preferably 0.15 to 0.7 mm. When a fibrous reinforcing filler is employed, it is preferred that the fibrous reinforcing filler be present in an amount of from 25 to 75% by weight, preferably 25 to 50% by weight, based on the total weight of the inorganic filler in a scale form and the fibrous reinforcing filler. When the amount of the fibrous reinforcing filler is more than 75% by weight, based on the total weight of the inorganic filler in a scale form and the fibrous reinforcing filler, the dimensional precision (shrinking ratio in molding, and anisotropy of the linear expansion coefficient) cannot be satisfactorily improved.

The phosphoric acid ester to be used in the present invention is represented by formula (I) above.

In formula (I), it is preferred that each of $Q^1$, $Q^2$, $Q^3$ and $Q^4$ be a methyl group.

In formula (I), n represents an integer of 1 or more. The heat resistance and processability of the resin composition produced vary, depending on the n value. Illustratively stated, when the n value becomes large, the heat resistance of the resin composition becomes high, while the processability becomes low. On the other hand, when the n value becomes small, the above tendencies are reversed. A preferred range of n is 1 to 5. A mixture of the phosphoric acid esters having different n values can also be used.

In the present invention, the phosphoric acid esters represented by formula (I) may be used individually or in combination.

The phosphoric acid ester to be used in the present invention has a structure in which phosphoric acid ester groups are bonded with each other through a bisphenol, and has a monofunctional phenol at terminals thereof.

Examples of bisphenols include 2,2-bis(4-hydroxyphenyl)propane (so-called bisphenol A), 2,2-bis(4- hydroxy-3-methylphenyl)propane, bis(4-hydroxyphenyl) methane, bis(4-hydroxy-3,5-dimethylphenyl)methane and 1,1-bis(4-hydroxyphenyl)ethane. Of these, bisphenol A is especially preferred.

Examples of monofunctional phenols include phenol, a monoalkylphenol, a dialkylphenol and a trialkylphenol. The monofunctional phenols can be used individually or in combination. Especially, phenol, cresol, dimethylphenol (mixed xylenol), 2,6-dimethylphenol and trimethylphenol are preferred.

As mentioned above, the phosphoric acid ester to be used in the present invention has a structure in which phosphoric acid ester groups are bonded to each other through a bisphenol. Due to this structure, the volatilization of the phosphoric acid ester is largely suppressed. Further, the phosphoric acid ester exhibits high performances which have not been achieved by conventional polyphosphates having a structure wherein phosphoric acid ester groups are bonded to each other through resorcinol or hydroquinone. Specifically, the mechanical part of the present invention, which is produced by molding the resin composition containing the specific phosphoric acid ester, is prevented from deterioration of appearance (e.g., discoloration and blistering), such as has been experienced in the case of a resin composition containing the conventional polyphosphate when allowed to stand under high temperature and high humidity conditions.

Further, in the present invention, when a molded article is produced from a resin composition containing a phosphoric acid ester comprising, as a monofunctional phenol, a monoalkylphenol, dialkylphenol or a trialkylphenol, the obtained molded article is further improved with respect to thermal stability and resistance to hydrolysis as compared to the molded article produced from a resin composition comprising a phosphoric acid ester compound having an unsubstituted monofunctional phenol at terminals thereof.

In the present invention, when the phosphoric acid ester having phosphoric acid groups bonded through a bisphenol and having an alkyl-substituted monofunctional phenol at terminals thereof, the obtained molded article exhibits excellent characteristics such that the molded article is prevented from deterioration of properties, such as electrical characteristics, flame retardancy and appearance, even when the molded article is contacted with moisture under heated conditions.

With respect to the molded articles produced from a resin composition which contains a conventional organic phosphoric acid ester compound having only a feature of high molecular weight, such as resorcinol-polyphosphate and hydroquinone-polyphosphate, the following problems are encountered. That is, such a resin composition has poor thermal stability, thereby causing a reaction between the phosphoric acid ester compound and the resin during the molding thereof. As a result, the gelation with respect to the resin is caused, so that it becomes impossible to produce a molded article from the resin efficiently under high temperature conditions. Further, the phosphoric acid ester compound is likely to be decomposed during the molding of the resin, thereby forming an acidic components, e.g., a phosphoric acid, which causes decomposition of the resin. Accordingly, the molecular weight and various properties of the resin are lowered, so that the resultant molded article has not only low practicability but also poor long-term stability. In addition, such a resin composition is disadvantageous in that the acidic compound formed by the decomposition of the phosphoric acid ester causes corrosion of various parts and portions of a molding machine, which are contacted with the resin composition, such as metallic parts thereof (e.g., a barrel and a screw) and an inner wall surface of the mold cavity, and that when a molded article produced from such a resin composition is contacted with a metallic part of other articles during the use of the molded article, corrosion of the metallic part is likely to occur.

On the other hand, the high precision resin mechanical part of the present invention does not suffer hydrolysis during the production thereof by molding under high temperature and high humidity conditions, and has excellent thermal stability during the production thereof by molding, so that the mechanical part is free from conventionally experienced disadvantages, such as volatilization of the flame retardant contained in the resin, smoking caused by the volatilization of the flame retardant and occurrence of MD (mold deposit) during the production thereof by molding. Further, the mechanical part of the present invention is unlikely to suffer from the lowering of properties, such as electrical characteristics, flame retardancy and appearance of the shaped article, which is generally caused when the resin absorbs water under the high temperature and high humidity conditions, as mentioned above. In the present invention, the decomposition of the resin composition is markedly suppressed. Accordingly, the mechanical part of the present invention is unlikely to cause corrosion of the metallic parts or portions of the molding machine and corrosion of the metallic portion of other products which is contacted with the molded article.

In the present invention, the phosphoric acid ester represented by formula (I) can be obtained by reacting a bisphenol and a monofunctional phenol with phosphorus oxychloride. With respect to the method for producing a phosphoric acid ester represented by formula (I), reference can be made to , for example, U.S. Pat. No. 3,492,373.

In the amorphous thermoplastic resin composition which constitutes the high precision resin mechanical part (for use in OA machines) of the present invention, the phosphoric acid ester is used in an amount of from 3 to 50 parts by weight, preferably from 5 to 20 parts by weight per 100 parts by weight of the amorphous thermoplastic resin. When the phosphoric acid ester is used in an amount which is smaller than the above range, the obtained mechanical part becomes unsatisfactory with respect to the flame retardancy. Meanwhile, when the phosphoric acid ester is used in an amount which exceeds the above range, the obtained mechanical part becomes disadvantageously low with respect to the resistance to heat.

In the present invention, a phosphoric acid ester other than represented by formula (I) can be used as long as the effects of the present invention are not impaired. The total weight of the phosphoric acid ester represented by formula (I) and the other phosphoric acid ester is from 3 to 50 parts by weight, per 100 parts by weight of component (A). A phosphoric acid ester other than represented by formula (I) can generally be used in an amount of 50% by weight or less, preferably 30% by weight or less, based on the total weight of the phosphoric acid ester represented by formula (I) and the other phosphoric acid ester. Examples of phosphoric acid esters other than represented by formula (I) include triphenyl phosphate, tricresyl phosphate, trixylenyl phosphate, cresyldiphenyl phosphate, dicresylphenyl phosphate, hydroxyphenyldiphenyl phosphate and compounds obtained by a modification thereof with a substituent, and condensation-type phosphoric acid esters.

With respect to the amorphous thermoplastic resin to be used in the present invention, there is no particular limitation as long as the moldability of the resin composition and the characteristics of the high precision resin mechanical part produced therefrom are satisfactory. However, from the viewpoint of the high compatibility of the resin with the phosphoric acid ester represented by formula (I), (a) a polyphenylene ether resin, (b) a polycarbonate resin or (c) a styrene resin, is preferably used.

(a) Polyphenylene ether resin (hereinafter referred to simply as "PPE resin") means a PPE resin or a resin composition comprised mainly of a PPE resin and a polystyrene resin (hereinafter referred to simply as "PS resin"). If desired, the resin composition may contain a small amount of polyethylene or the like.

As the PPE resin, a phenylene ether homopolymer or copolymer comprising a recurring unit represented by formula (II-1) and/or (II-2) can be used:

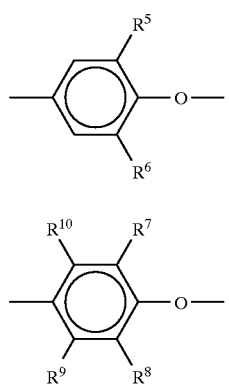

wherein each of $R^5$, $R^6$, $R^7$, $R^8$, $R^9$ and $R^{10}$ independently represents an alkyl group having 1 to 4 carbon atoms, an aryl group having 6 to 8 carbon atoms, a halogen atom or a hydrogen atom, provided that $R^9$ and $R^{10}$ do not simultaneously represent a hydrogen atom.

Representative Examples of PPE resins include homopolymers, such as poly(2,6-dimethyl-1,4-phenylene) ether, poly(2-methyl-6-ethyl-1,4-phenylene)ether, poly(2-ethyl-6-n-propyl-1,4 -phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene) ether and poly(2-methyl-6-hydroxyethyl-1,4-phenylene) ether. Of these, poly(2,6-dimethyl-1,4-phenylene)ether is especially preferred.

Further, a polyphenylene ether copolymer comprised mainly of a polyphenylene structure which is obtained by copolymerizing an alkyl-substituted phenol (e.g., 2,3,6-trimethylphenol) represented by formula (II-3) with, for example, o-cresol:

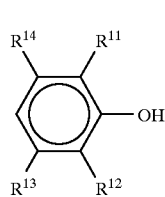

wherein each of $R^{11}$, $R^{12}$, $R^{13}$ and $R^{14}$ independently represents an alkyl group having 1 to 4 carbon atoms, a halogen atom or a hydrogen atom, provided that $R^{11}$, $R^{12}$, $R^{13}$ and $R^{14}$ do not simultaneously represent a hydrogen atom.

With respect to PPE resins, reference can be made to, for example, U.S. Pat. No. 4,788,277.

The above-mentioned PPE resin can be used in the form of a graft copolymer. For example, a graft copolymer in which a styrene compound is grafted onto the PPE resin, or a graft copolymer in which a copolymer of a styrene compound and a compound copolymerizable therewith (e.g., maleic anhydride) is grafted onto the PPE resin. With respect to the grafting method, reference can be made to, for example, U.S. Pat. No. 4,097,556.

(b) The polycarbonate resin (hereinafter referred to simply as "PC resin") is a polymer comprising a recurring unit represented by formula (III-1):

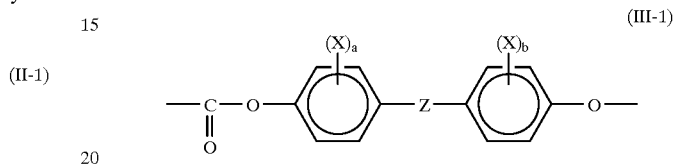

wherein Z represents a bond, or an alkylene having 1 to 8 carbon atoms, an alkylidene having 2 to 8 carbon atoms, a cycloalkylene having 5 to 15 carbon atoms, $SO_2$, SO, O, CO or a group represented by formula (III-2); each X independently represents a hydrogen atom or an alkyl group having 1 to 8 carbon atoms; and each of a and b independently represents an integer of from 0 to 4.

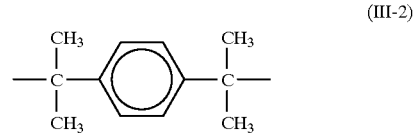

The PC resin can be produced, for example, by the reaction of a bifunctional phenol with a carbonate precursor (e.g., phosgene) or by the ester exchange reaction of a bifunctional phenol with another carbonate precursor (e.g., diphenyl carbonate) in a solvent, such as methylene chloride, in the presence of a conventional acid acceptor and molecular weight modifier.

Examples of bifunctional phenols include 2,2-bis(4-hydroxyphenyl)propane (so-called bisphenol A), hydroquinone, 4,4'-dihydroxydiphenyl, bis(4-hydroxyphenyl)alkane, bis(4-hydroxyphenyl)cycloalkane, bis(4-hydroxyphenyl)sulfide, bis(4-hydroxyphenyl)sulfone, bis(4-hydroxyphenyl)sulfoxide and bis(4-hydroxyphenyl) ether. Of these, bisphenol A and a mixture of bisphenol A with a bifunctional phenol other than bisphenol A are preferred. In addition, a homopolymer of the bifunctional phenol, a copolymer of two or more bifunctional phenols, or a mixture of the homopolymer and the copolymer may be used. Further, the PC resin to be used in the present invention may include a thermoplastic random branched polycarbonate obtained by reacting a multifunctional aromatic compound with a carbonate precursor, or with a carbonate precursor and a bifunctional phenol. With respect to the bifunctional phenol, reference can be made to, for example, Unexamined Japanese Patent Application Laid-Open specification Nos. 2-115262 and 63-289056.

In the present invention, the above-mentioned PC resin can be mixed with a styrene resin (such as a PS resin, a HIPS resin, an AS resin, an ABS resin and/or the like), a PPE resin, a polyolefin resin, a polyamide resin, a thermoplastic elastomer, polyethylene telephthalate, polybutylene telephthalate, an acrylic resin, a phenolic resin, phenolic novolak and/or the like. However, the resins which can be mixed with the PC resin are not limited to those mentioned above. Of the above resins, an ABS resin, an HIPS resin and an AS resin are especially preferred for mixing with the PC resin.

(c) As a styrene resin to be used in the present invention, a vinyl aromatic polymer or a rubber modified vinyl aromatic polymer is used.

Examples of vinyl aromatic polymers include polystyrene, a polymer of styrene substituted with an alkyl at a nucleus thereof (such as o-methylstyrene, p-methylstyrene, m-methylstyrene, 2,4-dimethylstyrene, ethylstyrene or p-tert-butylstyrene), and a polymer of an α-alkyl-substituted styrene (such as α-methylstyrene or α-methyl-p-methylstyrene); and a copolymer of at least one of the above-mentioned substituted styrenes and at least one of vinyl compounds other than the vinyl aromatic polymers. Examples of such vinyl compounds copolymerizable with the vinyl aromatic polymer include a methacrylic acid ester (such as methyl methacrylate or ethyl methacrylate), an unsaturated nitrile compound (such as acrylonitrile and methacrylonitrile), and an acid anhydride (such as maleic anhydride). Of these, polystyrene, and a styrene-acrylonitrile copolymer (AS resin) are preferred.

Examples of rubber modified vinyl aromatic polymers include polybutadiene, a styrene-butadiene copolymer, a rubber-modified styrene-acrylonitrile copolymer (ABS resin), polyisoprene, a butadiene-isoprene copolymer, natural rubber, and an ethylene-propylene copolymer. Of these, polybutadiene, a styrene-butadiene copolymer and a rubber-modified styrene-acrylonitrile copolymer (ABS resin) are preferred. Particularly, a rubber-modified polystyrene containing polybutadiene in which not less than 10% of the double bonds is hydrogenated (that is, a HIPS resin), is especially preferred because of excellent thermal stability thereof. With respect to the method for producing an HIPS resin, reference can be made to, for example, U.S. Pat. Nos. 4,185,049, 3,346,520, 2,862,906, 3,243,481 and 3,903,202.

With respect to the method for preparing a thermoplastic resin composition by combining the components defined above, i.e., an amorphous thermoplastic resin, a phosphoric acid ester represented by formula (I) and an inorganic filler in a scale form, and optionally a fibrous reinforcing filler, there is no specific limitation. For preparing the resin composition, various methods can be employed as long as they are methods which are generally used for effecting melt-kneading. For example, there can be employed a method in which a phosphoric acid ester and an inorganic filler in a scale form are added to a resin in a molten form, followed by mixing, and a method in which all of the above-mentioned components are first mixed together and subsequently the resultant mixture is melt-kneaded. In the preparation of the thermoplastic resin composition to be used in the present invention, conventionally known kneading machines, such as an extruder, a heating roll, a kneader or a Banbury mixer, can be used.

The thermoplastic resin composition to be used for preparing the high precision resin mechanical part of the present invention for use in an office automation machine may contain various additives, such as an antioxidant (e.g., a phenolic antioxidant, a phosphoric antioxidant or a hindered phenolic antioxidant), a stabilizer, a colorant (e.g., titanium oxide or carbon black), a lubricant (e.g., a metallic soap), a flowability agent, and a reinforcing elastomer containing a styrene-butadiene block copolymer, polyester amide or the like, as long as the excellent effects of the present invention are not impaired. The above-mentioned additives can be used in such amounts as generally employed.

The term "high precision resin mechanical part for use in an office automation machine" is used herein as a general term for defining high precision mechanical parts to be used for precision machines which are required to function with high accuracy and high precision. There is no particular limitation with respect to the high precision mechanical parts. As high precision mechanical parts, for example, (1) mechanical parts for a machine in which writing and reading are done with light and/or magnetism; (2) mechanical parts which are required to hold other parts at predetermined positions in an accurate and precise manner (e.g., chassis); and (3) mechanical parts which are required to be engaged (or fitted) or slide relative to other parts in an accurate and precise manner, can be mentioned. However, the high precision mechanical parts are not limited to those mentioned above. Examples of mechanical parts (1) include chassis for a driving device of a CD-ROM, a writing-type optical (or magnetic) disk, an FD (floppy disk), a HD (hard disk) and the like. Examples of mechanical parts (2) include chassis for a printer, a copier, a personal computer, a facsimile machine and the like. Examples of mechanical parts (3) include a tray for a driving device of a CD-ROM. However, the high precision resin mechanical parts of the present invention for use in an office automation machine are not limited to those mentioned above.

Therefore, as specific examples of office automation machines for which the high precision resin mechanical part of the present invention is used, there can be mentioned copiers, printers, facsimile machines, personal computers, word processors, portable communication apparatus, composite machines composed thereof, and other machines (e.g., computers, game machines, sound-reproducing systems and audio-visual machines) in which writing and reading are done with light and/or magnetism on disks (namely, disks as information media), such as a CD (compact disk), a CD-ROM, a LD (laser disk), a magneto-optical disk [MD (trademark minidisk)], an optical disk, a FD (floppy disk) and a HD (hard disk).

It is a requisite that the above-mentioned mechanical parts have excellent molded form characteristics, mechanical properties (e.g., rigidity and strength), heat resistance, flame retardancy, dimensional precision and dimensional stability, and these excellent characteristics and properties must be satisfactorily maintained even under stringent conditions. That is, the characteristics and properties of the mechanical parts must not deteriorate at high temperature (e.g., at a temperature which is only about 30° C. lower than the heat distortion temperature) and at high humidity. Among the above-mentioned properties, the requirements for the dimensional precision and dimensional stability are most strict in the mechanical parts. That is, it is required that the mechanical parts exhibit small dimensional change under high temperature and high humidity conditions and be unlikely to suffer from a dimensional strain, such as warpage. With respect to conventional mechanical parts which are made by injection molding a reinforced resin containing only a fibrous inorganic filler (e.g., glass fibers), there is a disadvantage such that warpage occurs at high temperature, leading to a dimensional strain. Such a disadvantage is caused due to the large linear expansion coefficient anisotropy inside of the molded product (the large anisotropy is caused by the orientation of the fibrous inorganic filler). On the other hand, other types of conventional mechanical parts made of a reinforced resin containing a phosphorus-containing flame retardant, such as triphenyl phosphate or cresyl diphenylphosphate, also have a disadvantage in that the flame retardancy and appearance (e.g., blister) of the mechanical part are likely to be lowered due to the flame retardant denaturation caused by moisture absorption under high temperature and high humidity conditions.

However, the high precision mechanical part of the present invention can surprisingly maintain high dimensional precision even under high temperature and high humidity conditions.

In addition, it has unexpectedly been found that the high precision mechanical part of the present invention has very small anisotropy in rigidity and strength inside of the molded product due to the incorporation of an inorganic filler in a scale form, so that the mechanical part have excellent vibration characteristics. With respect to the vibration characteristics, the important factors are vibration-damping property and characteristic resonance frequency.

The term "vibration-damping property" means a property which can damp a vibration. In general, plastics have a good vibration-damping property as compared to metallic materials, such as sheet metals and die-casted aluminum, since plastics exhibit a viscoelastic behavior. Plastics, however, have poor rigidity. For overcoming such poor rigidity, plastics are generally reinforced with a fibrous inorganic filler. However, it is well known that such reinforced plastics frequently have poor vibration-damping property.

However, it has unexpectedly been found that the mechanical part of the present invention, which is made of a resin composition containing an inorganic filler in a scale form, have excellent vibration-damping property. The mechanism by which the excellent vibration-damping property is exhibited by the mechanical part of the present invention has not yet been elucidated; however, it is presumed that such an excellent vibration-dispersing property of the mechanical part of the present invention is exerted by the dispersion of the vibration.

The vibration-damping property of the mechanical part of the present invention can be more improved by incorporating a small amount of a resin component which has a glass transition temperature (Tg) at around room temperature. Examples of such resin components include a rubber component, such as an acrylic rubber; an elastomer component, such as an ethylene-propylene rubber; and an olefin polymer resin.

The term "characteristic resonance frequency" means a resonance frequency characteristic of a shaped article, and the characteristic resonance frequency depends on the morphology of the shaped article, and the rigidity and density of the material of the shaped article. When the morphology of the shaped article is not varied, the characteristic resonance frequency of the shaped article is proportional to the square root of a value which is obtained by dividing the rigidity of the material by the density of the material. Although plastics generally have small densities as compared to metallic materials, such as sheet metals and die-casted aluminum, the rigidities of plastics are extremely smaller than those of metallic materials, so that plastics have small characteristic resonance frequencies. In general, the vibration of a motor in operation in a machine and the vibration occurring around such a machine have a frequency of less than 300 Hz. Therefore, for preventing a mechanical part for use in a high precision machine from being resonated, it is preferred that the mechanical part have a characteristic resonance frequency of 300 Hz or higher, which is outside the frequency ranges of the vibration of a motor in operation and of the vibration occurring around the machine.

It has unexpectedly been found that with respect to the mechanical part of the present invention comprising a specific resin composition, the resonance property value (characteristic resonance frequency) determined by computer simulation is well in agreement with the resonance property value determined by an actual measurement of the vibration of the mechanical part, so that the mechanical part of the present invention has extremely high reproducibility in resonance property. By contrast, the conventional mechanical parts which are made by molding a resin composition containing only a fibrous inorganic filler, exhibit complicated resonance characteristics such that the resonance property value calculated by computer simulation or calculated from the value of the flexural modulus of elasticity and the value of the density of the material of the mechanical part (these values are available from the general data book for properties of various materials) is not always in agreement with the actually measured resonance properties value. A good agreement between the predicted resonance property value calculated by computer simulation and the actual resonance property value, as in the case of the mechanical part of the present invention, is extremely advantageous in designing a high precision mechanical part.

It is quite unexpected that the mechanical part of the present invention exhibits the above-mentioned excellent vibration properties, and these excellent vibration properties are totally unexpected from the conventional techniques. Such excellent vibration properties are especially important in mechanical parts for use in a precision apparatus, such as a driving device (having a rotating part) for a CD-ROM.

The above-mentioned mechanical parts are required to have extremely high dimensional precision. For example, with respect to an optical chassis of a facsimile machine which chassis holds an optical lens for reading information, and a traverse base chassis of a CD-ROM drive, it is required that the dimensional precision be such that any errors or deviations must be on the order of several tens of $\mu$m. Furthermore, it is also required that such a mechanical part satisfactorily maintain the dimensional precision thereof even when the change in ambient temperature change would occur. In other words, it is required that the linear expansion coefficient and the anisotropy of the linear expansion coefficient be small. The high precision mechanical part of the present invention has, for example, the following dimensional precision characteristics:

(1) a dimensional tolerance of ±100 $\mu$m, preferably ±50 $\mu$m, more preferably ±25 $\mu$m per 100 mm (predetermined or designed);

(2) an absolute value of warpage of 1 mm or less, preferably 800 $\mu$m or less, more preferably 500 $\mu$m or less per 100 mm (predetermined or designed); and (3) an absolute value of flatness of 1 mm or less, preferably 800 $\mu$m or less, more preferably 500 $\mu$m or less.

The molding method for a resin composition for the production of the mechanical part of the present invention for use in an office automation machine is not particularly limited. However, in general, an injection molding method can be advantageously used. In the injection molding method, it is desirable to minimize the flow strain which is generated in the molded product during the molding process. When the flow strain is large, a large molecular orientation strain remains in the molded product. The molecule orientation strain causes problems such that the molding shrinkage ratio becomes non-uniform, resulting in warpage, and the practical heat resistance of the molded product becomes poor. In the injection molding, it is desirable that the gate of a mold and the molding conditions be, respectively, so designed and chosen that the flow strain can be as small as possible.

It has been found that when gas-assisted injection molding is employed for producing the mechanical part of the present invention, the dimensional accuracy of the produced mechanical part is remarkably improved as compared to the dimensional accuracy of the mechanical part produced by usual injection molding. That is, in molding the resin composition, the gas-assisted injection molding is extremely effective for suppressing the flow strain of the resin. Particularly, the gas-assisted injection molding is very effective for preparing a molded product having a thickness as small as 1.5 mm or less, in which flow strain is likely to occur. In the methods for gas-assisted injection molding, a liquid can also be used instead of gas. With respect to the gas-assisted injection molding, reference can be made to, for example, U.S. Pat. Nos. 4,824,732, 4,923,666, 4,101,617 and 5,173,241.

Further, it has also been found that the mechanical part produced by gas-assisted injection molding has not only excellent dimensional precision at room temperature but also improved dimensional stability at high temperatures. This is unexpected from the conventionally known effects of gas-assisted injection molding.

In the present invention, when gas-assisted injection molding is employed, the adverse influence of the molecular orientation (residual set) of the molded resin on the molded products can be minimized, so that mechanical parts having high dimensional precision can be obtained.

Creep resistance is one of the characteristics required for resin mechanical parts. The high precision resin mechanical part of the present invention unexpectedly has high creep resistance as compared to the conventional resin mechanical parts. That is, the rate of distortion of the mechanical part of the present invention is low even when the mechanical part is placed under stress for a prolonged period of time. The reason for this has not yet been exactly elucidated; however, it is presumed that the high creep resistance of the mechanical part of the present invention is ascribed to the specific flame retardant used.

BEST MODE FOR CARRYING OUT THE INVENTION

Hereinbelow, the present invention will be described in more detail with reference to the following Examples and Comparative Examples, but they should not be construed as limiting the scope of the present invention.

In the Examples and Comparative Examples, various properties of the molded products are measured as follows. Specimens are prepared from the thermoplastic resin composition by injection molding, and the properties of the specimens are determined according to the following test methods.

(1) Heat distortion temperature

The heat distortion temperature of a specimen is measured in accordance with ASTM-D648.

(2) Flexural modulus

The flexural modulus of a specimen is measured in accordance with ASTM-D790.

(3) Izod impact strength

The Izod impact strength of a ¼ inch-thick, notched specimen is measured in accordance with ASTM-D256.

(4) Flame retardancy

The flame retardancy of a 1/16 inch-thick, strip-shaped specimen is measured in accordance with the method described in UL-Subject 94 (with respect to this method, see, for example, U.S. Pat. No. 4,966,814).

(5) Warpage (as measured by "Asahi Kasei Method")

The maximum magnitude of warpage (mm) of a specimen is measured using a flat plate (150 mm×150 mm×3 mm) and a feeler gauge.

The smaller the maximum magnitude of the warpage, the better the dimensional precision.

(6) Linear expansion coefficient

The linear expansion coefficient of a ⅛ inch-thick dumbbell specimen for use in a tensile test is measured at the temperature of −30 to +60° C. in accordance with ASTM-D696. In the measurement, the linear expansion coefficient in the flow direction of the resin composition and the linear expansion coefficient in a direction perpendicular to the flow direction of the resin composition are measured using a wire resistance strain gauge. Prior to the measurement, the specimen is subjected to annealing, thereby removing any strain thereof, and pre-treated in accordance with ASTM-D618.

(7) Anisotropy of the linear expansion coefficient

The anisotropy of the linear expansion coefficient in the present invention means the ratio of the linear expansion coefficient in the direction perpendicular to the flow direction to the linear expansion coefficient in the flow direction. The closer to 1 the above-mentioned ratio is, the smaller the anisotropy of the linear expansion coefficient of the resin composition. The resin composition to be used for producing the flame retardant, high precision resin mechanical part for use in an office automation machine needs to have a linear expansion coefficient anisotropy of 2 or less.

(8) Exposure test at high temperature and high humidity

With respect to the PPE resins, an exposure test at high temperature and high humidity is conducted by exposing a 1/16 inch-thick strip-shaped specimen to saturated steam having a temperature of 121° C. and a pressure of 2 atm. for 96 hours. With respect to the PC resins, an exposure test-at high temperature and high humidity is conducted by dipping a 1/16 inch-thick strip-shaped specimen in hot water at 95° C. for 150 hours.

(9) Appearance

Figure 1:
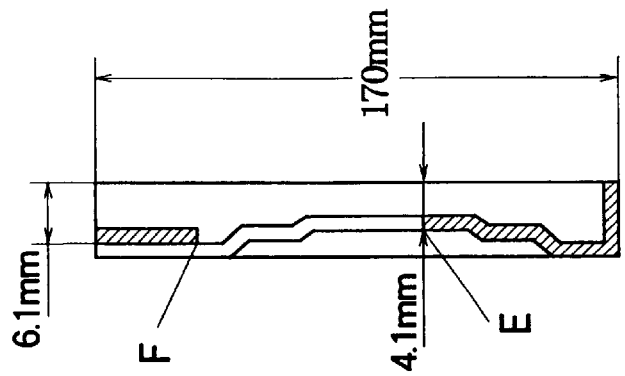
In FIG. 1 (a) and 1(b), the characters designate the following parts and portions.
Figure 1:
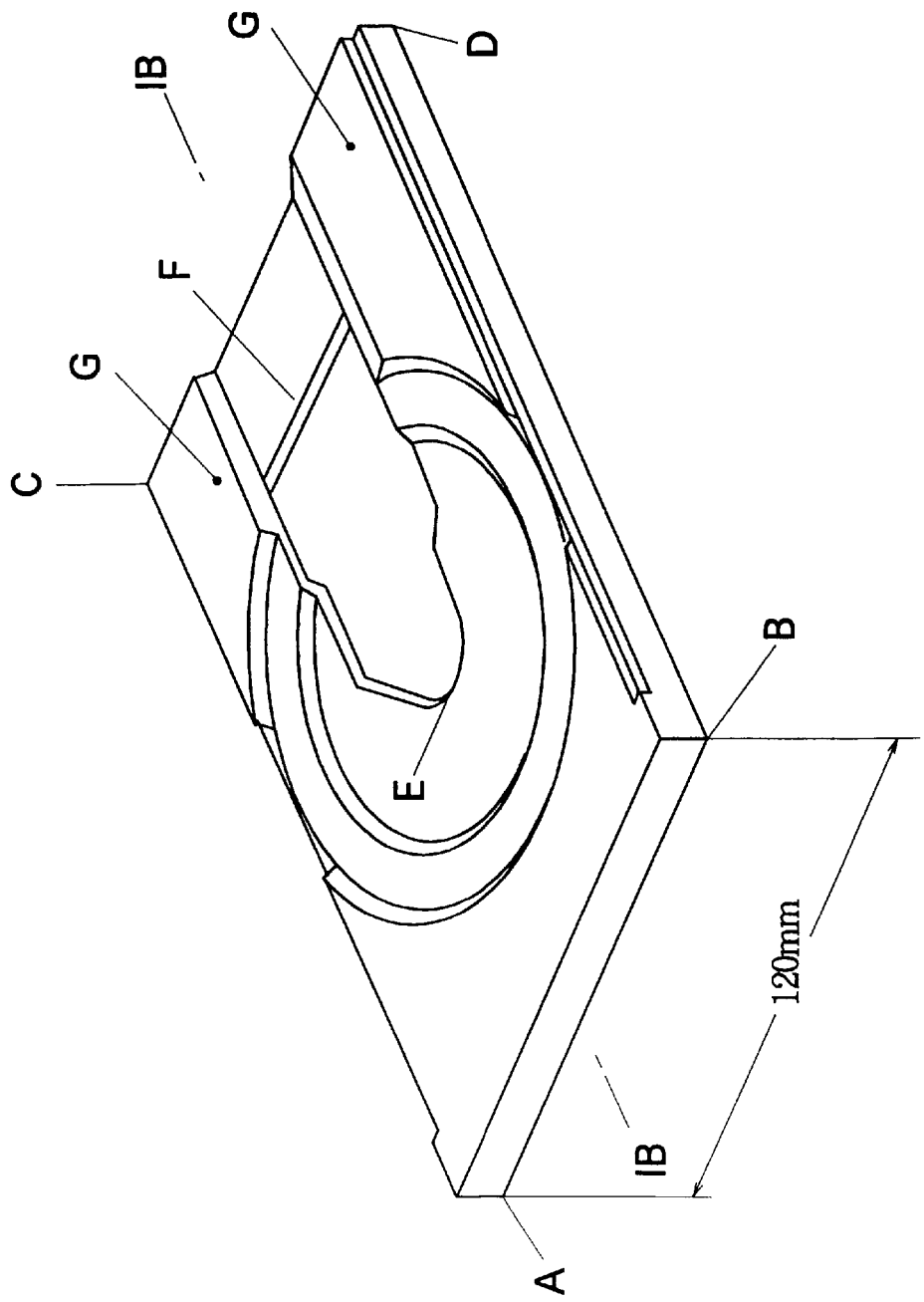

The appearance of the molded products in a tray form as shown in FIG. 1 is evaluated by visual observation. Ten thousand trays are molded continuously.

(10) Warpage of tray

A tray as shown in FIG. 1 is placed on a mold platen and fixed thereto. The magnitude of the warpage of the tray is determined by measuring the dimension of the tray at individual sites thereof in Z direction (vertical direction), and the clearances (warpage) between the mold platen and the individual sites of the tray, using a coordinate measuring machine (Model AE 122, manufactured and sold by Mitsutoyo Corporation, Japan). The measured warpage is used as a criterion for evaluating the dimensional precision.

The phosphoric acid esters A–G as shown below are used in the Examples and Comparative Examples.

Phosphoric acid ester A is bisphenol A-polycresyl phosphate represented by the following formula (IV):

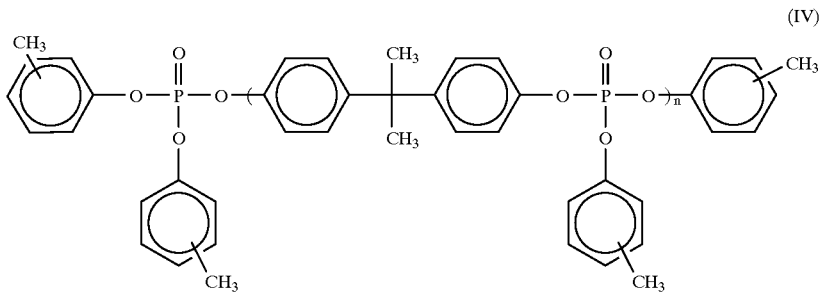

wherein n represents an integer of from 1 to 3.

Phosphoric acid ester B is bisphenol A-polyxylenyl phosphate represented by the following formula (V):

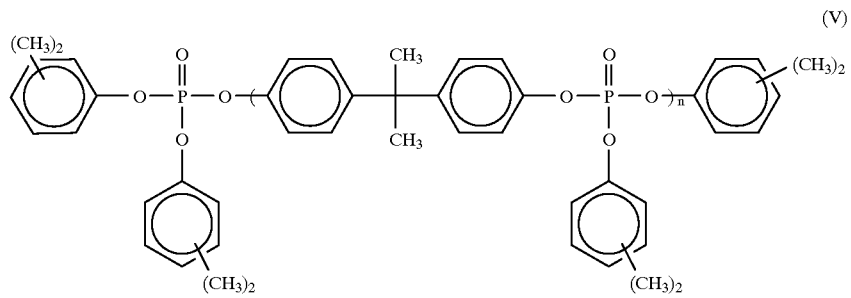

wherein n represents an integer of from 1 to 3.

Phosphoric acid ester C is bisphenol A-poly(2,6-xylenyl) phosphate represented by the following formula (VI):

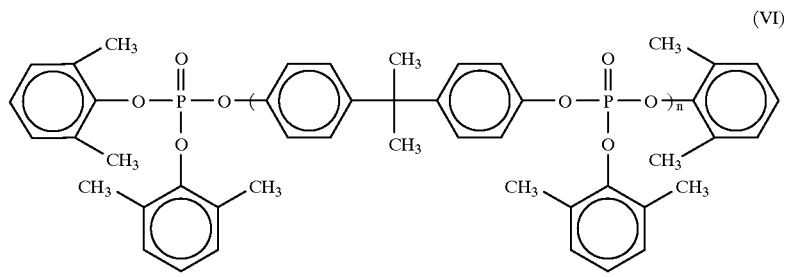

wherein n represents an integer of from 1 to 3.

Phosphoric acid ester D is bisphenol A-polydiphenyl phosphate represented by the following formula (VII):

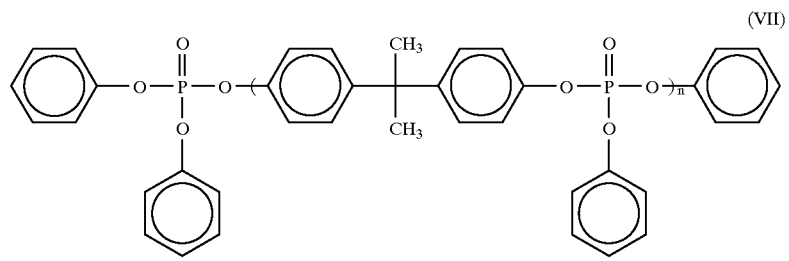

wherein n represents an integer of from 1 to 3.

Phosphoric acid ester E is resorcinol-polyphenyl phosphate represented by the following formula (VIII):

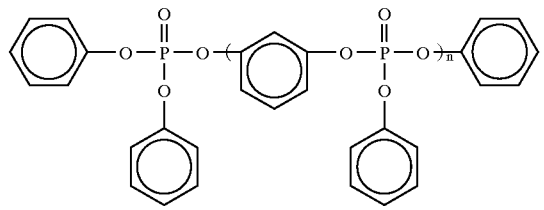

(VIII)

wherein n represents an integer of from 1 to 3.

Phosphoric acid ester F is hydroquinone-polyphenyl phosphate represented by the following formula (IX):

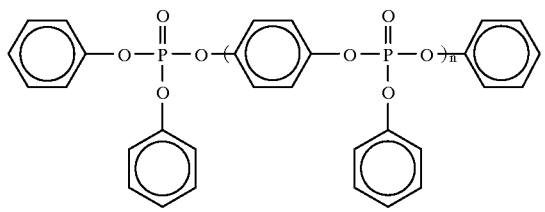

(IX)

wherein n represents an integer of from 1 to 3.

Phosphoric acid ester G is triphenylphosphate (trade name: TPP, manufactured and sold by Daihachi Chemical Industry Co., Ltd.) represented by the following formula (X):

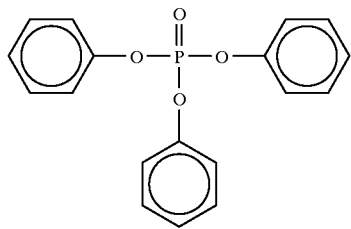

(X)

EXAMPLES 1 TO 4 AND COMPARATIVE EXAMPLES 1 TO 3

Pellets are produced from resin compositions by extrusion kneading, using a PCM-30 twin-screw extruder (manufactured and sold by Ikegai Corporation, Japan) at a cylinder temperature of 320° C. The resin compositions are composed of a poly(2,6-dimethyl-1,4-phenylene)ether resin (hereinafter referred to simply as "PPE") which exhibits an intrinsic viscosity (η) of 0.52 at 30° C. in chloroform, a rubber-modified polystyrene resin (Asahi Chemical Polystyrene H9104 manufactured and sold by Asahi Chemical Industry Co., Ltd., Japan), a polystyrene resin (Asahi Chemical Polystyrene 685 manufactured and sold by Asahi Chemical Industry Co., Ltd., Japan), each of the above-mentioned phosphoric acid esters A to G as a flame retardant agent, a glass flake (Micro glass fleka REFG-302 sold by NIPPON SHEET GLASS Co., Ltd., Japan) as an inorganic filler, and a mixture of zinc oxide/zinc sulfide /MARK 2112 (ADEKA ARGUS Chemical Co., Ltd., Japan) (weight ratio of the three components=1:1:1) as a stabilizing agent [the chemical nomenclature of MARK 2112 is tris(2,4-di-t-butylphenyl)phosphite]. The PPE, rubber-modified polystyrene resin, polystyrene resin, phosphoric acid ester, glass flake, and stabilizing agent are used in amount ratios as shown in Table 1. Using an injection molding machine, the obtained pellets are then subjected to injection molding at a cylinder temperature of 290° C., to thereby obtain 1/16 inch-thick specimens for use in a test for flame retardancy.

With respect to the obtained specimens, the flame retardancy is measured, and an exposure test at high temperature and high humidity is conducted. Subsequently, in order to evaluate a mechanical part for use in a driving device for a CD-ROM, a tray as shown in FIG. 1 is made from the above-mentioned pellets by injection molding, using an injection molding machine at a cylinder temperature of 290° C. The temperature of the mold is set at 80° C. Ten thousand trays are molded continuously, and the appearances of the obtained trays and the mold inner wall are evaluated. The degree of volatilization of the resin composition is evaluated by visually observing the amount of smoking from a nozzle of the injection molding machine in the purging (injection without using a mold) test of the resin composition.

Results are shown in Table 1.

In Examples 1 to 4, the obtained trays exhibit a characteristic resonance frequency value which is well in agreement with the characteristic resonance frequency value calculated by computer simulation.

EXAMPLES 5 TO 10 AND COMPARATIVE EXAMPLES 4 AND 5

Pellets are produced from resin compositions by extrusion kneading, using a PCM-30 twin-screw extruder (manufactured and sold by Ikegai Corporation, Japan) at a cylinder temperature of 320° C. The resin compositions are composed of a PPE which exhibits an intrinsic viscosity (η) of 0.52 at 30° C. in chloroform, a HIPS (Asahi Chemical Polystyrene H9104 manufactured and sold by Asahi Chemical Industry Co., Ltd., Japan), a PS (Asahi Chemical Polystyrene 685 manufactured and sold by Asahi Chemical Industry Co., Ltd., Japan), the above-mentioned phosphoric acid ester A as a flame retardant agent, and, as inorganic fillers, a glass fiber (RES03-TP1051, manufactured and sold by NIPPON SHEET GLASS Co., Ltd., Japan), a glass flake (Micro glass fleka REFG-302 sold by NIPPON SHEET GLASS Co., Ltd., Japan) and mica (Suzorite Mica 200KI, manufactured and sold by Kuraray Co., Ltd., Japan). The PPE, HIPS, PS, phosphoric acid ester, and inorganic filler are used in amount ratios as shown in Table 2.

The properties of the resin composition are determined in accordance with the above-mentioned test methods.

Results are shown in Table 3.

Subsequently, in order to evaluate a mechanical part for use in a driving device for a CD-ROM, a tray as shown in FIG. 1 is made from the above-mentioned pellets by injection molding, using an injection molding machine at a cylinder temperature of 290° C. The temperature of the mold is set at 80° C. The dimensional precision (warpage) of each of the obtained trays is measured.

Results are shown in Table 4.

In Comparative Example 4, as shown in Table 3, the resin composition containing glass fibers alone as an inorganic filler exhibits a large warpage and a large anisotropy of the linear expansion coefficient (an index of dimensional precision). In Comparative Example 5, the resin composition containing glass beads (EGB731A, manufactured and sold by Toshiba Ballotini Co., Ltd. Japan) alone as an inorganic filler exhibits a small warpage and a small anisotropy of linear expansion coefficient, but the flexural modulus thereof is low. Results of the measurement shown in Table 4 indicate that there is a correlation between the warpage of the trays shown in Table 4 and each of the warpage and the anisotropy of the linear expansion coefficient which are shown in Table 3, however, there is no correlation between those data which are measured with respect to the trays produced from the resin compositions containing glass beads or mica alone as an inorganic filler. That is, the larger the warpage and the anisotropy of the linear expansion coefficient shown in Table 3, the larger the warpage of the tray shown in Table 4.

In Examples 5 to 10, the obtained trays exhibit a characteristic resonance frequency value which is well in agreement with the characteristic resonance frequency value calculated by computer simulation.

EXAMPLES 11 TO 14 AND COMPARATIVE EXAMPLES 6 TO 8

Pellets are produced from resin compositions by extrusion kneading, using a PCM-30 twin-screw extruder (manufactured and sold by Ikegai Corporation, Japan) at a cylinder temperature of 310° C. The resin compositions are composed of a polycarbonate resin [Iupilon S-1000, manufactured and sold by Mitsubishi Engineering Plastics Corp., Japan), each of the above-mentioned phosphoric acid esters A to G as a flame retardant agent, and a glass flake (Micro glass fleka REFG-302 sold by NIPPON SHEET GLASS Co., Ltd., Japan) as an inorganic filler. The polycarbonate resin, phosphoric acid ester and glass flake are used in amount ratios as shown in Table 5. Using an injection molding machine, the obtained pellets are then subjected to injection molding at a cylinder temperature of 280° C., to thereby obtain $\frac{1}{16}$ inch-thick specimens for use in a test for flame retardancy.

With respect to the obtained specimens, the flame retardancy is measured, and an exposure test at high temperature and high humidity is conducted. Subsequently, in order to evaluate a mechanical part for use in a driving device for a CD-ROM, a tray as shown in FIG. 1 is made from the above-mentioned pellets by injection molding, using an injection molding machine at a cylinder temperature of 280° C. The temperature of the mold is set at 80° C. Ten thousand trays are molded continuously, and the appearances of the obtained trays and the mold inner wall are evaluated. The degree of volatilization of the resin composition is evaluated by visually observing the amount of smoking from a nozzle of the injection molding machine in the purging test of the resin composition.

Results are shown in Table 5.

In Examples 11 to 14, the obtained trays exhibit a characteristic resonance frequency value which is well in agreement with the characteristic resonance frequency value calculated by computer simulation.

EXAMPLES 15 TO 20 AND COMPARATIVE EXAMPLES 9 AND 10

Pellets are produced from resin compositions by extrusion kneading, using a PCM-30 twin-screw extruder (manufactured and sold by Ikegai Corporation, Japan) at a cylinder temperature of 310° C. The resin compositions are composed of a polycarbonate resin (Iupilon S-1000, manufactured and sold by Mitsubishi Engineering Plastics Corp., Japan), the above-mentioned phosphoric acid ester A and, as inorganic fillers, a glass fiber (RES03-TP1051, manufactured and sold by NIPPON SHEET GLASS Co., Ltd., Japan), a glass flake (Micro glass fleka REFG-302, and mica which is surface-treated with aminosilane (Repco S200HG-CT, manufactured and sold by REPCO LTD., Japan). The polycarbonate resin, phosphoric acid ester A and inorganic filler are used in amount ratios as shown in Table 6. The properties of the resin compositions are determined in accordance with the above-mentioned test methods.

Results are shown in Table 7.

Subsequently, in order to evaluate a mechanical part for use in a driving device for a CD-ROM, a tray as shown in FIG. 1 is made from the above-mentioned pellets by injection molding, using an injection molding machine at a cylinder temperature of 280° C. The temperature of the mold is set at 80° C. The dimensional precision (warpage) of each of the obtained trays is measured.

Results are shown in Table 8.

In Comparative Example 9, as shown in Table 7, the resin composition containing glass fibers alone as an inorganic filler exhibits a large warpage and a large anisotropy of the linear expansion coefficient (an index of dimensional precision). In Comparative Example 10, the resin composition containing glass beads alone as an inorganic filler exhibits a small warpage and a small anisotropy of linear expansion coefficient, but a flexural modulus thereof is low. Results of the measurement shown in Table 8 indicate that there is a correlation between the warpage of the trays shown in Table 8 and each of the warpage and the anisotropy of the linear expansion coefficient which are shown in Table 7, except for the data measured with respect to the trays produced from the resin compositions containing glass beads as an inorganic filler.

In Examples 15 to 20, the obtained trays exhibit a characteristic resonance frequency value which is well in agreement with the characteristic resonance frequency value calculated by computer simulation.

EXAMPLES 21 TO 26 AND COMPARATIVE EXAMPLES 11 TO 12

Preparation of ABS resin

Seven hundred fifty parts by weight of a butadiene latex (which has a rubber content of 40% by weight) having an average particle diameter of 0.30 $\mu$m and 1 part by weight of an emulsifier (disproportionated potassium rosinate) are charged in a polymerization tank and heated to 70° C. with stirring under flowing of nitrogen. To the resultant mixture are added a mixed liquid comprising 200 parts by weight of acrylonitrile, 500 parts by weight of styrene, 0.8 part by weight of cumene hydroperoxide and 0.7 part by weight of t-dodecylmercaptan, and an aqueous solution which is obtained by dissolving, into 500 parts by weight of distilled water, 1.0 part by weight of sodium formaldehyde sulfoxylate, 0.10 part by weight of ferrous sulfate (FeSO$_4$.7H$_2$O) and 0.2 part by weight of disodium ethylenediaminetetraacetate over 6 hours with stirring, to thereby perform a polymerization reaction.

Stirring is further continued for 2 hours to complete the polymerization. The polymerization degree of monomers is 94%. An aqueous solution of dilute sulfuric acid is added to the reaction mixture to coagulate the formed latex of a graft copolymer. The coagulated latex is washed, dehydrated and dried, to thereby obtain a white ABS resin.

Preparation of AS resin 0.4 part by weight of potassium persulfate and 2.0 parts by weight of potassium rosinate are dissolved in 180 parts by weight of distilled water. To the resultant solution are added 70 parts by weight of styrene, 30 parts by weight of acrylonitrile and 0.2 part by weight of dodecylmercaptan, and reacted at 70° C. for 4 hours, to thereby obtain an aromatic vinyl copolymer. The polymerization degree of monomers is 94%. An aqueous solution of dilute sulfuric acid is added to the resultant reaction mixture to agglomerate the formed copolymer. The resultant copolymer is washed, dehydrated and dried, to thereby obtain a white AS resin.

Production of a mechanical part

Forty parts by weight of a polycarbonate resin having a weight average molecular weight of 25,000, 12 parts by weight of the ABS resin, 8 parts by weight of the AS resin and 10 parts by weight of phosphoric acid ester A are mixed by means of a Henschel mixer. The resultant mixture is melt-kneaded with a filler shown in Table 9 (which is used in the amount ratio shown in Table 9), using a PCM-30 twin-screw extruder in which a cylinder temperature is set at 250° C., to thereby obtain reinforced resin pellets. Subsequently, in order to evaluate a mechanical part for use in a driving device for a CD-ROM, a tray as shown in FIG. 1 is made from the above-obtained pellets by injection molding, using an injection molding machine at a cylinder temperature of 260° C. and a mold temperature of 60° C. The dimensional precision (warpage) of the trays is measured. Results are shown in Table 8.

As shown in Table 8, there is a correlation between the warpage of the trays in these Examples and Comparative Examples and the warpage of trays in Examples 15 to 20 and Comparative Examples 9 and 10 above, except for the warpage of trays measured with respect to the polycarbonate resin composition containing glass beads alone as an inorganic filler.

In Examples 21 to 26, the obtained trays exhibit a characteristic resonance frequency value which is well in agreement with the characteristic resonance frequency value calculated by computer simulation.

EXAMPLES 27 TO 30

A molded resin article in a tray form is produced by gas-assisted injection molding at a cylinder temperature of 280° C. and a mold temperature of 80° C., using individually PPE resin compositions of Examples 5 and 6 and PC resin compositions of Examples 15 and 16. The shot volume of the molten resin is 95% of the full shot. Gas ($N_2$) is introduced from the gate into a molten resin mass immediately after completion of the injection of the molten resin. The gas is held at a pressure of 150 kg/cm$^2$ for 20 seconds. Then, the molten resin mass is cooled for one minute and the obtained molded resin article is released from the mold. The dimensional precision (warpage) of the obtained trays is determined. Results are shown in Table 10. The trays produced by gas-assisted injection molding in Examples 27 to 30 have a more improved dimensional precision than the trays produced by ordinary injection molding in Examples 5 and 6 and Examples 15 and 16.

In Examples 27 to 30, the obtained trays exhibit a characteristic resonance frequency value which is well in agreement with the characteristic resonance frequency value calculated by computer simulation.

EXAMPLES 31 TO 36

Chassis for holding an optical element as shown in FIG. 2 are produced by gas-assisted injection molding and ordinary injection molding at a cylinder temperature of 280° C. and a mold temperature of 80° C., using respectively the PPE resin compositions of Examples 5 and 6, and the PC resin compositions of Examples 15 and 16. Likewise, chassis for holding an optical element as shown in FIG. 2 are produced by gas-assisted injection molding and ordinary injection molding at a cylinder temperature of 260° C. and a mold temperature of 60° C., using respectively the PC/ABS resin compositions of Examples 21 and 22. The flatness of the section shown by hatching in FIG. 2 of the obtained molded resin article, is determined. Then, the change in dimension (the change in the flatness) of the hatched section of the molded resin article is determined after the molded article is subjected to a heat exposure test for 250 hours in an oven at 60°.

In the gas-assisted injection molding, the shot volume of the molten resin is 97% of the full shot. Gas ($N_2$) is introduced from a portion of the cavity inner well into a molten resin mass immediately after completion of the injection of the molten resin. The gas is held at a pressure of 200 kg/cm$^2$ for 12 seconds. Then, the molten resin mass is cooled for one minute and the obtained shaped resin article is released from the mold.

The dimensional precision of the shaped resin article is measured in the following manner. The molded resin article is secured onto a mold platen. Then, the flatness of the section, shown by the hatching in FIG. 2, is determined by means of a coordinate measuring machine (Model AE 122, manufactured and sold by Mitsutoyo Corporation, Japan) using a measuring program (Geopack 400, manufactured and sold by Mitsutoyo corporation, Japan). In accordance with the above-mentioned program, the flatness is determined as follows. With respect to the above-mentioned hatched section, a plurality of measurement sites (at least 15 sites) are arbitarily selected. From the selected measurement sites, a calculated plane is obtained by calculation according to the least square method. Then, two planes are imagined on both sides of the calculated plane, which two planes are in parallel to the calculated plane. A minimum distance value is obtained with respect to distances at which distances the above-mentioned two parallel planes are located so as to form therebetween a space capable of accomodating therein all measurement sites. Such a minimum value (mm) is defined as the flatness. The larger the value of flatness thus determined, the lower the flatness. Results are shown in Table 11.

In Examples 31 to 36, the obtained chassis exhibit a characteristic resonance frequency value which is well in agreement with the characteristic resonance frequency value calculated by computer simulation.

TABLE 1

(Formulation of resin composition (parts by weight))

| Components | Example Nos. | | | | Comparative Example Nos. | | |
|---|---|---|---|---|---|---|---|
| | 1 | 2 | 3 | 4 | 1 | 2 | 3 |
| Poly(2,6-dimethyl-1,4-phenylene)ether | 40 | 40 | 40 | 40 | 40 | 40 | 40 |
| Polystyrene H9104(HIPS) | 15 | 15 | 15 | 15 | 15 | 15 | 15 |
| Polystyrene 685 (GPPS) | 5 | 5 | 5 | 5 | 5 | 5 | 5 |
| Zinc oxide/zinc sulfide/ MARK 2112 | 0.3 | 0.3 | 0.3 | 0.3 | 0.3 | 0.3 | 0.3 |
| Phosphoric acid ester A | 10 | | | | | | |
| Phosphoric acid ester B | | 10 | | | | | |
| Phosphoric acid ester C | | | 10 | | | | |
| Phosphoric acid ester D | | | | 10 | | | |
| Phosphoric acid ester E | | | | | 10 | | |
| Phosphoric acid ester F | | | | | | 10 | |
| Phosphoric acid ester G | | | | | | | 10 |
| Micro glass fleka REFG-302 (glass flake) | 30 | 30 | 30 | 30 | 30 | 30 | 30 |
| Flame retardancy (UL-94) before exposure test at high temperature and humidity | V-1 | V-1 | V-1 | V-1 | V-1 | V-1 | V-1 |
| Flame retardancy (UL-94) after exposure test at high temperature and humidity | V-1 | V-1 | V-1 | V-1 | V-2 | V-2 | V-2 |
| Smoking amount (visual observation) | Almost none | Almost none | Almost none | Almost none | Almost none | Almost none | Much |
| Appearances of molded product and mold cavity — 2000th shot | No change | No change | No change | No change | No change | No change | *) |
| 5000th shot | No change | No change | No change | No change | *) | *) | *) |
| 10000th shot | No change | No change | No change | No change | *) | *) | *) |
| Appearance change after exposure test at high temperature and humidity | No change | No change | No change | No change | Discoloration and Blister | Discoloration and Blister | Discoloration |

*Note: Oily matter deposit was observed at a portion of product which corresponds to the forward end of the resin flow and observed at a portion of the mold inner wall which corresponds to the forward end of the resin flow.

TABLE 2

(Formulation of resin composition (parts by weight))

| Components | Example Nos. | | | | | | Comparative Example Nos. | |
|---|---|---|---|---|---|---|---|---|
| | 5 | 6 | 7 | 8 | 9 | 10 | 4 | 5 |
| Poly(2,6-dimethyl-1,4-phenylene)ether | 40 | 40 | 40 | 40 | 40 | 40 | 40 | 40 |
| Polystyrene H9104(HIPS) | 15 | 15 | 15 | 15 | 15 | 15 | 15 | 15 |
| Polystyrene 685 (GPPS) | 5 | 5 | 5 | 5 | 5 | 5 | 5 | 5 |
| Zinc oxide/zinc sulfide/MARK 2112 | 0.3 | 0.3 | 0.3 | 0.3 | 0.3 | 0.3 | 0.3 | 0.3 |
| Phosphoric acid ester A | 10 | 10 | 10 | 10 | 10 | 10 | 10 | 10 |
| Micro glass fleka REFG-302 (glass flake) | 30 | 15 | 15 | — | 7.5 | — | — | — |
| RES03-TP1015F (glass fiber) | — | 15 | — | 15 | 15 | — | 30 | — |
| Suzorite Mica 200KI | — | — | 15 | 15 | 7.5 | 30 | — | — |
| Glass beads EGB731A | — | — | — | — | — | — | — | 30 |

TABLE 3

(Characteristics of molded products)

|  |  |  | Example Nos. | | | | | | Comparative Example Nos. | |
| --- | --- | --- | --- | --- | --- | --- | --- | --- | --- | --- |
|  |  |  | 5 | 6 | 7 | 8 | 9 | 10 | 4 | 5 |
| Warpage | Asahi Kasei Method | mm | 0.15 | 0.25 | 0.18 | 0.27 | 0.24 | 0.2 | 0.63 | 0.45 |
| Flexural modulus | ASTM-D790 | kg/cm$^2$ | 66000 | 76000 | 64000 | 79000 | 77000 | 62000 | 66000 | 45000 |
| Izod impact strength | ASTM-D256, notched | kg · cm/cm | 3.0 | 4.9 | 3.0 | 5.0 | 5.0 | 2.0 | 5.2 | 4.0 |
| Linear expansion coefficient (−30 to +60° C.) × 10$^{-5}$ | Flow direction | mm/mm/° C. | 3.2 | 3.1 | 3.0 | 3.0 | 3.0 | 3.0 | 1.7 | 4.8 |
|  | Direction perpendicular to the flow direction | mm/mm/° C. | 3.8 | 5.5 | 4.2 | 5.6 | 5.5 | 4.0 | 5.9 | 5.7 |
| Anisotropy of linear expansion coefficient |  |  | 1.2 | 1.8 | 1.4 | 1.9 | 1.8 | 1.3 | 3.4 | 1.2 |
| Heat distortion temperature | ASTM-D643 | ° C. | 100 | 100 | 100 | 100 | 100 | 100 | 102 | 105 |
| Flame retardance | UL-94 | Class | V-1 | V-1 | V-1 | V-1 | V-1 | V-1 | V-1 | V-1 |

TABLE 4

(warpage of molded products)

[unit:mm]

| Measure-ment site | Example Nos. | | | | | | Comparative Example Nos. | |
|---|---|---|---|---|---|---|---|---|
| | 5 | 6 | 7 | 8 | 9 | 10 | 4 | 5 |
| A | 0.15 | 0.19 | 0.14 | 0.21 | 0.20 | 0.15 | 0.35 | 0.23 |
| B | 0.12 | 0.17 | 0.13 | 0.2 | 0.19 | 0.14 | 0.32 | 0.22 |
| C | 0.13 | 0.18 | 0.15 | 0.19 | 0.19 | 0.14 | 0.34 | 0.21 |
| D | 0.19 | 0.21 | 0.2 | 0.22 | 0.2 | 0.2 | 0.41 | 0.25 |
| E (4.1#) | 4.1 | 4.4 | 4.2 | 4.5 | 4.5 | 4.2 | 4.8 | 4.6 |
| F (6.1#) | 6.5 | 6.7 | 6.5 | 6.8 | 6.7 | 6.5 | 7.0 | 6.9 |

Note: "#" shows predetermined value, and measured value indicated with respect to E and F is predetermined value plus warpage value.

TABLE 5

(Formulation of resin composition (parts by weight))

| Components | Example Nos. | | | | Comparative Example Nos. | | |
|---|---|---|---|---|---|---|---|
| | 11 | 12 | 13 | 14 | 6 | 7 | 8 |
| Iupilon S-1000 | 60 | 60 | 60 | 60 | 60 | 60 | 60 |
| Phosphoric acid ester A | 10 | | | | | | |
| Phosphoric acid ester B | | 10 | | | | | |
| Phosphoric acid ester C | | | 10 | | | | |
| Phosphoric acid ester D | | | | 10 | | | |
| Phosphoric acid ester E | | | | | 10 | | |
| Phosphoric acid ester F | | | | | | 10 | |
| Phosphoric acid ester G | | | | | | | 10 |
| Micro glass fleka REFG-302 (glass flake) | 30 | 30 | 30 | 30 | 30 | 30 | 30 |
| Flame retardancy (UL-94) before exposure test at high temperature and humidity | V-0 | V-0 | V-0 | V-0 | V-0 | V-0 | V-0 |
| Flame retardancy (UL-94) after exposure test at high temperature and humidity | V-0 | V-0 | V-0 | V-0 | V-2 | V-2 | V-2 |
| Smoking amount (visual observation) | Almost none | Almost none | Almost none | Almost none | Almost none | Almost none | Much |
| Appearances of molded product and mold cavity 2000th shot | No change | No change | No change | No change | No change | No change | *) |
| 5000th shot | No change | No change | No change | No change | *) | *) | *) |
| 10000th shot | No change | No change | No change | No change | *) | *) | *) |
| Appearance change after exposure test at high temperature and humidity | No change | No change | No change | No change | Discoloration and Blister | Discoloration and Blister | Discoloration |

*Note: Oily matter deposit was observed at a portion of product which corresponds to the forward end of the resin flow and observed at a portion of the mold inner wall which corresponds to the forward end of the resin flow.

TABLE 6

(Formulation of resin composition (parts by weight))

| Components | Example Nos. | | | | | | Comparative Example Nos | |
|---|---|---|---|---|---|---|---|---|
| | 15 | 16 | 17 | 18 | 19 | 20 | 9 | 10 |
| Iupilon S-1000 | 60 | 60 | 60 | 60 | 60 | 60 | 60 | 60 |
| Phosphoric acid ester A | 10 | 10 | 10 | 10 | 10 | 10 | 10 | 10 |
| Micro glass fleka REFG-302 (glass flake) | 30 | 15 | 15 | — | 7.5 | — | — | — |
| RES03-TP1015F (glass fiber) | — | 15 | — | 15 | 15 | — | 30 | — |
| Repco S200HG-CT (mica) | — | — | 15 | 15 | 7.5 | 30 | — | — |
| Glass beads EGB731A | — | — | — | — | — | — | — | 30 |

TABLE 7

(Characteristics of molded products)

|  |  |  | Example Nos. | | | | | | Comparative Example Nos. | |
|---|---|---|---|---|---|---|---|---|---|---|
|  |  |  | 15 | 16 | 17 | 18 | 19 | 20 | 9 | 10 |
| Warpage | Asahi Kasei Method | mm | 0.13 | 0.20 | 0.17 | 0.23 | 0.22 | 0.17 | 0.35 | 0.15 |
| Flexural modulus | ASTM-D790 | kg/cm$^2$ | 62000 | 70000 | 53000 | 71000 | 68000 | 51000 | 72000 | 43000 |
| Izod impact strength | ASTM-D256, notched | kg·cm/cm | 7.0 | 9.0 | 6.2 | 8.0 | 8.5 | 4.2 | 12.5 | 7.0 |
| Linear expansion coefficient (−30 to +60° C.) × 10$^{-5}$ | Flow direction | mm/mm/° C. | 3.2 | 2.7 | 3.0 | 2.5 | 2.6 | 2.9 | 2.i | 3.1 |
|  | Direction perpendicular to the flow direction | mm/mm/° C. | 4.0 | 4.8 | 4.2 | 4.8 | 4.7 | 4.3 | 5.3 | 4.2 |
| Anisotropy of linear expansion coefficient |  |  | 1.25 | 1.8 | 1.4 | 1.92 | 1.8 | 1.48 | 2.52 | 1.35 |
| Heat distortion temperature | ASTM-D643 | ° C. | 145 | 146 | 143 | 145 | 145 | 142 | 146 | 143 |
| Flame retardance | UL-94 | Class | V-0 | V-0 | V-0 | V-0 | V-0 | V-0 | V-0 | V-0 |

TABLE 8

(Warpage of molded products) [unit:mm]

| Measurement site | Example Nos. | | | | | | | | | | | | Comparative Example Nos. | | | |
|---|---|---|---|---|---|---|---|---|---|---|---|---|---|---|---|---|
|  | 15 | 16 | 17 | 18 | 19 | 20 | 21 | 22 | 23 | 24 | 25 | 26 | 9 | 10 | 11 | 12 |
| A | 0.16 | 0.21 | 0.17 | 0.22 | 0.21 | 0.18 | 0.15 | 0.2 | 0.15 | 0.21 | 0.2 | 0.16 | 0.35 | 0.16 | 0.32 | 0.17 |
| B | 0.13 | 0.19 | 0.15 | 0.20 | 0.20 | 0.17 | 0.13 | 0.18 | 0.14 | 0.19 | 0.19 | 0.16 | 0.34 | 0.17 | 0.33 | 0.15 |
| C | 0.14 | 0.18 | 0.14 | 0.19 | 0.19 | 0.16 | 0.15 | 0.19 | 0.17 | 0.19 | 0.19 | 0.17 | 0.32 | 0.18 | 0.3 | 0.17 |
| D | 0.2 | 0.24 | 0.21 | 0.25 | 0.23 | 0.19 | 0.19 | 0.22 | 0.2 | 0.23 | 0.23 | 0.19 | 0.4 | 0.2 | 0.38 | 0.19 |
| E (4.1#) | 4.2 | 4.6 | 4.3 | 4.6 | 4.6 | 4.4 | 4.2 | 4.5 | 4.2 | 4.5 | 4.6 | 4.4 | 4.8 | 4.4 | 4.9 | 4.5 |
| F (6.1#) | 6.6 | 6.9 | 6.6 | 7.0 | 6.9 | 6.6 | 6.5 | 6.8 | 6.6 | 6.9 | 6.9 | 6.6 | 7.2 | 6.5 | 7.1 | 6.5 |

Note: "#" shows predetermined value, and measured value indicated with respect to E and F is predetermined value plus warpage value.

TABLE 9

(Formulation of resin composition (parts by weight))

| Components | Example Nos. | | | | | | Comparative Example Nos. | |
|---|---|---|---|---|---|---|---|---|
|  | 21 | 22 | 23 | 24 | 25 | 26 | 11 | 12 |
| Polycarbonate resin | 40 | 40 | 40 | 40 | 40 | 40 | 40 | 40 |
| ABS resin | 12 | 12 | 12 | 12 | 12 | 12 | 12 | 12 |
| AS resin | 8 | 8 | 8 | 8 | 8 | 8 | 8 | 8 |
| Phosphoric acid ester A | 10 | 10 | 10 | 10 | 10 | 10 | 10 | 10 |
| Micro glass fleka | 30 | 15 | 15 | — | 7.5 | — | — | — |
| REFG-302 (glass flake) |  |  |  |  |  |  |  |  |
| RES03-TP1015F (glass fiber) | — | 15 | — | 15 | 15 | — | 30 | — |
| Repco S200HG-CT (mica) | — | — | 15 | 15 | 7.5 | 30 | — | — |
| Glass beads EGB731A | — | — | — | — | — | — | — | 30 |

TABLE 10

(warpage of molded products) [unit: mm]

| Measurement site | Example Nos. | | | |
|---|---|---|---|---|
|  | 27 | 28 | 29 | 30 |
| A | 0.10 | 0.12 | 0.11 | 0.13 |
| B | 0.08 | 0.11 | 0.07 | 0.11 |
| C | 0.09 | 0.12 | 0.09 | 0.12 |
| D | 0.12 | 0.14 | 0.12 | 0.14 |
| E (4.1#) | 4.1 | 4.3 | 4.2 | 4.3 |
| F (6.1#) | 6.2 | 6.3 | 6.2 | 6.3 |

Note: "#" shows predetermined value, and measured value indicated with respect to E and F is predetermined value plus warpage value.

TABLE 11

(Flatness of molded products)

[unit: mm]

| Heat exposure test 60° C. × 250 hours | | Example Nos. | | | | | |
|---|---|---|---|---|---|---|---|
| | | 31 | 32 | 33 | 34 | 35 | 36 |
| Flatness Gas-assisted injection molding | Before the test | 0.121 | 0.183 | 0.134 | 0.207 | 0.114 | 0.178 |
| | After the test | 0.129 | 0.195 | 0.150 | 0.225 | 0.120 | 0.190 |
| Flatness Ordinary injection molding | Before the test | 0.162 | 0.281 | 0.235 | 0.323 | 0.156 | 0.252 |
| | After the test | 0.179 | 0.310 | 0.265 | 0.364 | 0.170 | 0.277 |

INDUSTRIAL APPLICABILITY

The flame retardant, high precision resin mechanical part (for use in OA machines) of the present invention is not only free from conventionally experienced disadvantages, such as denaturation, volatilization and bleeding of the flame retardant, but also has high dimensional precision and excellent mechanical properties (e.g., mechanical strength and vibration-damping property), so that the mechanical part of the present invention can be advantageously used as a mechanical part for various types of OA machines which are required to function with high accuracy and high precision.

We claim:

1. A flame retardant, high precision resin mechanical part for use in office automation machines required to function with high accuracy and high precision, which is made by injection molding a thermoplastic resin composition comprising:

(A) 100 parts by weight of an amorphous thermoplastic resin;

(B) 5 to 1 50 parts by weight of an inorganic filler in a flake form, which is comprised of at least one filler selected from the group consisting of glass flakes and mica flakes, wherein said glass flakes have a weight average major diameter of 1,000 μm or less and a weight average aspect ratio of 5 or more and said mica flakes have a weight average diameter of 1,000 μm or less and a weight average aspect ratio of 10 or more; and (C) 3 to 50 parts by weight of a phosphoric acid ester represented by the following formula (I):

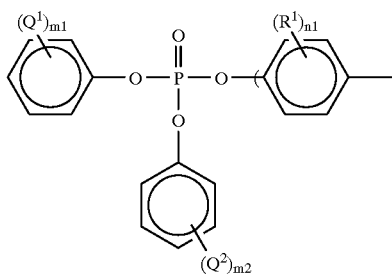

(1)

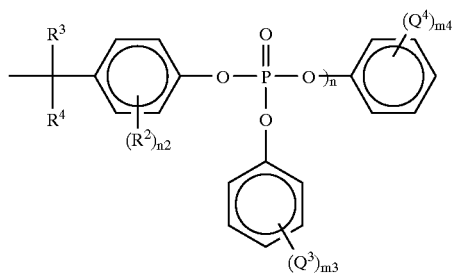

wherein each of $Q^1$, $Q^2$, $Q^3$ and $Q^4$ independently represents a hydrogen atom or an alkyl group having 1 to 6 carbon atoms; each of $R^1$, $R^2$, $R^3$ and $R^4$ independently represents a methyl group or a hydrogen atom; n represents an integer of 1 or more; each of n1 and n2 independently represents an integer of from 0 to 2; and each of m1, m2, m3 and m4 independently represents an integer of from 1 to 3.

2. The flame retardant, high precision resin mechanical part according to claim 1, wherein said injection molding is gas-assisted injection molding.

3. The flame retardant, high precision resin mechanical part according to claim 1, wherein said inorganic filler in a flake form is comprised of glass flakes.

4. The flame retardant, high precision resin mechanical part according to claim 1, wherein said inorganic filler in a flake form is comprised of mica flakes.

5. The flame retardant, high precision resin mechanical part according to claim 1, wherein said inorganic filler in a flake form is comprised of glass flakes and mica flakes.

6. The flame retardant, high precision resin mechanical part according to any one of claims 1 to 5, wherein said thermoplastic resin composition further comprises a fibrous reinforcing filler, and wherein the total weight of said inorganic filler in a flake form and said fibrous reinforcing filler is 150 parts by weight or less.

7. The flame retardant, high precision resin mechanical part according to claim 6, wherein said fibrous reinforcing filler is present in an amount of from 25 to 75% by weight, based on the total weight of said inorganic filler in a flake form and said fibrous reinforcing filler.

* * * * *